Sept. 20, 1971  C. C. COSTANZA  3,606,528
PRE-VIEWING STATION
Filed Sept. 23, 1969
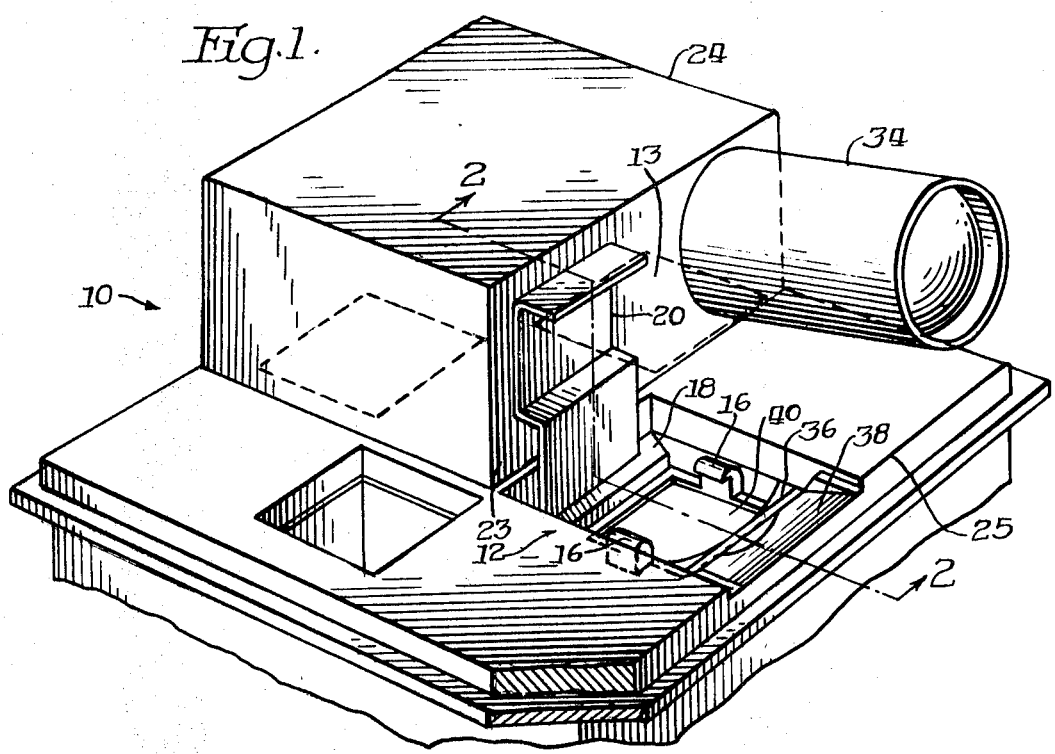
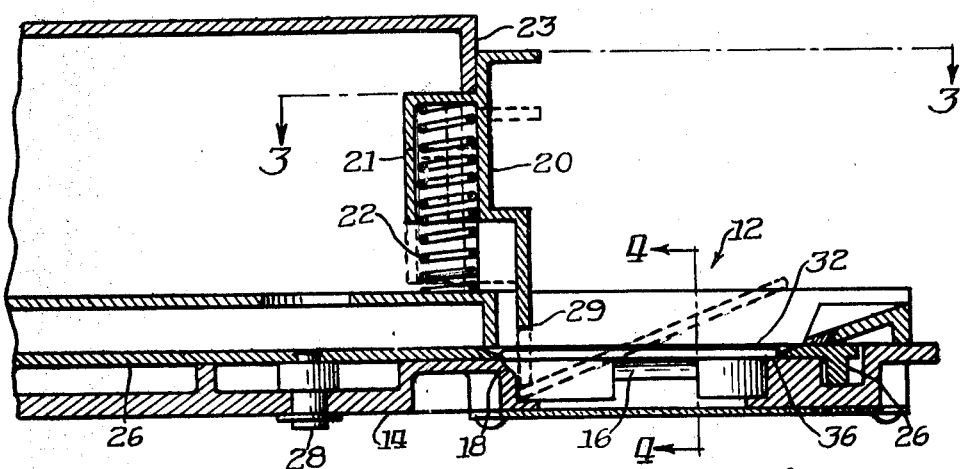
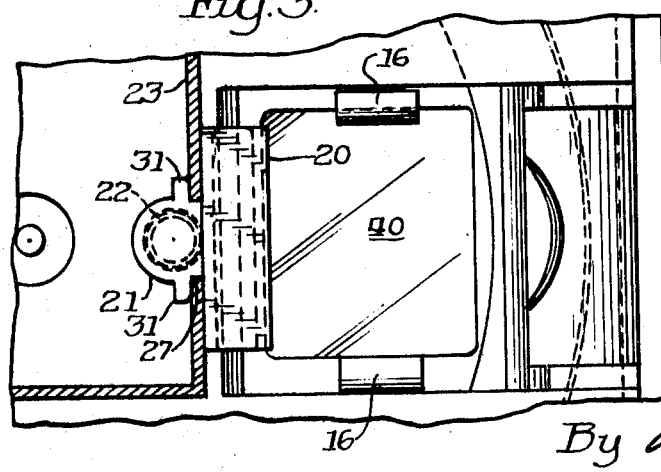
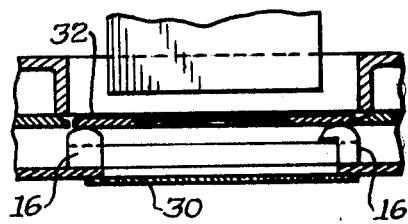
Inventor:
Carl C. Costanza
By William F. Pinsak Atty.

United States Patent Office 3,606,528
Patented Sept. 20, 1971

3,606,528
PRE-VIEWING STATION
Carl C. Costanza, Chicago, Ill., assignor to Bell &
Howell Company, Chicago, Ill.
Filed Sept. 23, 1969, Ser. No. 860,385
Int. Cl. G03b 21/00
U.S. Cl. 353—21                                                  8 Claims

ABSTRACT OF THE DISCLOSURE

A novel pre-viewing station in a slide projector that facilitates removal and insertion from the station. The slides when present at the pre-viewing station are oriented in a horizontal plane and viewed from the normal operating position are in the same orientation as when projected.

CROSS-REFERENCE TO RELATED APPLICATIONS

This invention is related to co-pending application Ser. Nos. 735,730, filed June 10, 1968; 860,384, filed Sept. 23, 1969.

BACKGROUND OF THE INVENTION

This invention relates generally to the field of slide projection systems. More specifically, it concerns the type of slide projector described in the above-identified applications. That projector transports slides through a multistation system with the slides positioned in a horizontal plane.

Prior to being projected, the slides are positioned at a pre-viewing station. While at the pre-viewing station, the operator may visually inspect the slide to determine its orientation, the nature of its subject matter, and its physical condition among many others. In short, the operator may make any necessary adjustments to the slide itself or to his presentation without waiting for the slide to be projected. To facilitate correction at the pre-viewing station, the slide must be easily ejected therefrom to allow the operator to make any necessary changes.

Additionally, the pre-viewing station must allow re-insertion of a slide after it has been ejected and for example its orientation corrected. By so constructing the pre-viewing station, the manual insertion of single slides, which may be a new supply just received from the developer, is facilitated and greatly increases the convenience of the projector for the operator.

SUMMARY OF THE INVENTION

This invention provides a slide support mechanism that is relatively unstable about a single axis of rotation. A mechanical device associated with the support mechanism actuatable to apply a force to the slide, can cause rotation of the slide about its unstable axis. The slide, having been tilted from the horizontal plane, may then be conveniently removed from the pre-viewing station. Furthermore a housing overlying the pre-viewing station has been designed to permit convenient insertion of a slide into the projector at that station.

BRIEF DESCRIPTION OF THE DRAWINGS

The features of the invention will become more apparent in the following description of a preferred embodiment and the drawings in which:

FIG. 1 is a perspective view of a slide projector embodying the invention.

FIG. 2 is a cross-sectional view taken along line 2—2 looking in the direction of the arrows.

FIG. 3 is a plan view taken along line 3—3 of FIG. 2.

FIG. 4 is a cross-sectional view taken along line 4—4 of FIG. 2 looking in the direction of the arrows.

DETAILED DESCRIPTION OF A PREFERRED EMBODIMENT

Referring to FIG. 1, there is seen a slide projector 10 embodying a pre-viewing station indicated generally at 12. As set out in the above-identified related applications, in normal operation a slide will be transported from the pre-viewing station 12 to a projection station 13 where the image will be projected through a projection barrel 34.

At the pre-viewing station 12 an aperture 40 in the platen 14 permits illumination by spill light from the projection lamp (not shown). Of course, the pre-viewing station 12 could be illuminated by a separate light source. A translucent material 30 may be placed over the aperture 40 to reduce glare. Thus a slide positioned over the aperture 40 will be visible to the operator.

Two bosses 16, 16 projecting upwardly from the platen 14, a chamfered surface 18 and a horizontal surface 36 formed on the platen 14 constitute the supporting surfaces upon which a slide 32 rests when positioned at the pre-viewing station 12, best seen in FIG. 2. The outer edges of the slide 32 contact the bosses 16, 16, the horizontal surface 36 and the chamfered surface 18. However contact with the chamfered surface 18 need not be made to maintain the slide 32 in a generally horizontal plane.

Best seen in FIG. 2, the bosses 16, 16 are not coextensive with the edges of the slide 32 they support. In fact, the bosses 16, 16 are of substantially shorter length than the slide edges they support and therefore provide a fulcrum about which the slide may be rotated. Such a rotation has been facilitated by providing the chamfered support surface 18 on the platen 14. Application of force downwardly on a slide 32 in the neighborhood of the chamfered support surface 18 will cause the slide to slip along the chamfered surface 18 and be tilted into a position such as shown in phantom in FIG. 2.

A force bar 20, slideably engaged with an upstanding portion 23 of the housing 24, conveniently effects the application of a downward force on the slide 32. A generally cylindrical chamber 21, attached to the bar 20 through a slot 27 in the upstanding portion 23 of the housing 24, houses a spring 22 which biases the bar 20 upwardly. Tabs 31, 31 fixed on the chamber 22 and the bar 20 itself prevent lateral displacement of the bar 20. Movement of the bar 20 is thereby restricted to a substantially vertical plane.

Normally the force applying edge 29 will be biased by the spring 22 to a position somewhat above a slide 32 at the previewing station 12, best seen in FIG. 2. The force applying edge 29 is associated with the chamfered support surface 18 such that the two will not contact one another when the bar 20 is urged downwardly. Thus, as illustrated in phantom in FIG. 2, depression of the bar 20 tilts the slide 32 at the pre-viewing station and the slide may then be easily removed therefrom. Of course, releasing the bar 20 permits the spring 22 to return it to the normal position, shown in solid in FIG. 2.

Re-insertion of an ejected slide or insertion of a new supply of slides may easily and simply be performed at the previewing station 12. As shown in FIG. 1, a portion of the horizontal segment 25 of the housing 24 has been cut away to completely expose the supporting surfaces 16, 16, 18, 36 at the pre-viewing station 12. The outer edge of the horizontal segment 25 being bevelled at 38 increases the ease with which a slide may be inserted into the pre-viewing station 12. To insert a slide, the operator need merely slip the slide under the force applying edge 29 of the bar 20 and release it to be supported by surfaces 16, 16, 18, 36.

Thus a novel re-viewing station for a slide projector has been described. The station permits the ejectment and insertion of slides with a minimum of effort. The novel construction being simple and economical is also extraordinarily durable and reliable.

It should be understood, of course, that the foregoing disclosure relates to only a preferred embodiment of the invention and that many modifications or alterations may be made without departing from the spirit and the scope of the invention as set forth in the appended claims.

Having thus described the invention, what is claimed is:

1. A pre-viewing station for viewing a photographic slide prior to projection comprising:
   a base platen,
   an aperture in said base platen,
   means for illuminating said aperture from below said platen,
   support means having at least two opposed portions for supporting a photographic slide in a horizontal plane above said aperture,
   and force means operable to be effective in a downward direction on an unsupported edge of a supported slide, spaced from said two portions, to tilt said supported slide out of said horizontal plane for removing said supported slide from said pre-viewing station.

2. The pre-viewing station set forth in claim 1 wherein:
   said support means comrises at least 2 upwardly projecting portions of said platen associated with one another to support at least two opposed edges of substantially square photographic slide, and said projecting portions which support parallel edges of said photographic slide being less than co-extensive therewith such that said slide may be tilted about an axis normal to the parallel supported edges.

3. The pre-viewing station set forth in claim 2 wherein:
   said force means is positioned so as to apply a downward force to a fourth edge of said photographic slide.

4. A photographic slide pre-viewing station comprising:
   a generally horizontal base platen,
   an aperture within said base platen,
   means for illuminating said aperture,
   a first supporting surface upstanding from said base platen in the vicinity of said aperture said first surface being substantially horizontal and possessing a longitudinal surface component sufficient to support an edge of a substantially square photographic slide,
   second and third supporting surfaces upstanding from said base platen in the vicinity of said aperture, possessing longitudinal surface components substantially normal to said longitudinal component of said first supporting surface and of lesser dimension than an edge of said photographic slide,
   said first, second and third supporting surfaces being of substantially the same height and spaced from one another such that they simultaneously will support three edges of said photographic slide, said second and third surfaces supporting parallel edges of said slide;
   and means for applying force to the fourth edge of said supported slide to cause rotation thereof out of a horizontal attitude.

5. The pre-viewing station set forth in claim 4 wherein:
   said force means comprises an upwardly spring biased bar.

6. A photographic slide pre-viewing station comprising:
   a generally horizontal base platen;
   an aperture within said base platen;
   means for illuminating said aperture;
   a substantially flat, horizontal surface upstanding from said platen for underlying one edge of a substantially square photographic slide;
   two bosses upstanding from said platen of lesser length than said edge of said photographic slide, underlying parallel second and third edges of said photographic slide, and spaced from the fourth edge of said photographic slide;
   a downwardly chamfered upstanding portion of said platen underlying said fourth edge of said photographic slide,
   and a bar vertically, slideably engaged to an upstanding housing associated with platen, said bar being spring biased to a point directly overlying said fourth edge of said photographic slide.

7. A pre-viewing station as set forth in claim 1 wherein said force means includes a bar operable from an ineffective position to a position to tilt said supported slide.

8. A pre-viewing station as set forth in claim 7, wherein said force means includes a spring for urging said bar to said ineffective position.

References Cited

UNITED STATES PATENTS

| 2,849,814 | 9/1958 | Rideout | 353—112 |
| 3,143,037 | 8/1964 | Jungjohann | 88—28 |

FOREIGN PATENTS

| 962,709 | 7/1964 | Great Britain | 353—21 |
| 1,463,252 | 11/1966 | Germany | 353—21 |

LEONARD FORMAN, Primary Examiner

A. J. MIRABITO, Assistant Examiner